United States Patent [19]

Nakatsu et al.

[11] Patent Number: 5,233,479
[45] Date of Patent: Aug. 3, 1993

[54] APPARATUS FOR DEMODULATING AND DECODING MULTI-LEVEL AMPLITUDE MODULATION SIGNAL CONVEYING DIGITAL DATA

[75] Inventors: Etsuto Nakatsu, Osaka; Haruo Ohta, Kyoto; Masaaki Kobayashi, Kawanishi, all of Japan

[73] Assignee: Matsushita Electric Industrial Co., Ltd., Osaka, Japan

[21] Appl. No.: 591,240

[22] Filed: Oct. 1, 1990

[30] Foreign Application Priority Data

Sep. 29, 1989 [JP] Japan .................................. 1-255649

[51] Int. Cl.$^5$ ........................ G11B 20/06; G11B 5/09
[52] U.S. Cl. ........................................ 360/29; 360/46
[58] Field of Search .......................... 360/29, 33.1, 46; 375/39, 76

[56] References Cited

PUBLICATIONS

"An Experimental Digital VTR Capable of 12 Hour Recording" by Yamamitsu et al; IEEE Transactions on Consumer Electronics, vol. CE-33, No. 3, Aug. 1987 pp. 240-248.
"An Analytical Approach To The Standardization of Digital Videotape Recorders" by Jürgen K. R. Heitmann; SMPTE Journal; Mar. 1982; pp. 229-232.
"An Experimental Digital Video Recording System" by L. M. H. E. Driessen et al; IEEE Transactions on Consumer Electronics, vol. CE-32, No. 3, Aug. 1986; pp. 362-370.

*Primary Examiner*—Aristotelis Psitos
*Assistant Examiner*—Won Tae C. Kim
*Attorney, Agent, or Firm*—Pollock, VandeSande & Priddy

[57] ABSTRACT

An apparatus for demodulating and decoding a multi-level amplitude modulation signal used to convey digital data, such as a QAM signal, having amplitude modulated carrier components differing in phase. The apparatus derives demodulated data values from that signal, and derives from average values of sets of these data values a set of compensated reference point data respectively corresponding to signal reference points of the multi-level modulation signal which are expressible as a symbol constellation in the I-Q plane. The compensated reference point data are used to obtain correct digital code values from the demodulated data, even if there is considerable distortion of the multi-level amplitude modulated signal, as is the case for such a signal when recorded and reproduced from a magnetic recording medium.

5 Claims, 5 Drawing Sheets

APPARATUS FOR DEMODULATING AND DECODING MULTI-LEVEL AMPLITUDE MODULATION SIGNAL CONVEYING DIGITAL DATA

BACKGROUND OF THE INVENTION

1. Field of Applicable Technology

The present invention relates to an apparatus for decoding a multi-level amplitude modulated signal used to convey digital data, such as a QAM signal, and in particular to an improved decoding apparatus whereby accurate decoding is achieved even for the case of the modulated signal being highly distorted, so that such an apparatus becomes applicable to a digital signal magnetic recording and reproduction apparatus.

2. Prior Art Technology

Various proposals have been made in the prior art for implementing a digital signal magnetic recording and reproduction apparatus. Some of such proposals have utilized baseband modulation, with a reduced amount of DC component in the recording signal due to the difficulty of recording and reproducing such a DC component. Such proposals include those utilizing NRZ codes, e.g. by J. K. R. Heitman "An Analytical Approach to the Standardization of Digital Video Tape Recorder", SMPTE J., 91,3, March 1982, also J. K. R. Heitman "Digital Video Recording, New Result in Channel coding and Error Protection", SMPTE J., 93:140–144, February 1984, proposals Using 8–10 block codes, e.g. J. L. E. Baldwin "Digital Television Recording with Low Tape Consumption", SMPTE J., 88:490–492, July 1979, proposals using Miller-square ($M^2$) codes, e.g. L. Gallo "Signal System Design for a Digital Video Recording System", SMPTE J., 86:749–756, October 1977, proposals using ternary partial response system, etc.

However use of such baseband modulation in a digital signal magnetic recording and reproduction apparatus results in a low level of utilization efficiency of the recording frequency band (i.e. a low value of transmissible bit rate per unit band), due to the basic system of recording the binary signals. For instance, assuming the roll-off rate of a Nyquist transmission system to be 0.5, the utilization efficiency of the frequency band is at most 1.33 bits/sec/Hz. This results in increased tape consumption, making it difficult to achieve sufficiently long recording times.

Various ways of increasing the recording rate have been envisaged in the prior art. These include expanding the recording frequency band, increasing the number of recording channels, or increasing the relative velocity between the tape and recording head. However if the recording frequency band is increased, this will result in a corresponding decrease in the S/N ratio, so that a substantial increase in recording rate cannot be achieved. If the number of recording channels is increased, then the track width of each channel must of course be narrowed, so that this again leads to a decrease in the S/N ratio. If the tape/head relative velocity is increased, then this will result in problems with regard to increased tape consumption.

Error control coding can be applied to counteract such deterioration of the S/N ratio, by providing an improvement in the error rate. However such error control coding results in a reduction of the bit rate of the actual data that can be recorded. Such error control coding is described for example by L.M.H.E. Dreissen et al., "An Experimental Digital Video Recording System" IEEE Conf. June 1986, or by C. Yamamitsu et al., "An Experimental Digital VTR Capable of 12-hour Recording", IEEE Trans. on CE, CE-33, No. 3, pp 240–248, 1987.

With all of the above prior art proposals, video data are recorded on tape in the form of a digital recording signal. It has also been been proposed in the prior art to combine a multi-level modulation scheme (which provides a high utilization efficiency of the transmission frequency band) with an error control code, for digital data transmission (e.g. G. Ungerboeck "Channel Coding with Multilevel/Phase Signals", IEEE Trans. on IT, IT-28, No. 1, pp. 55–67, 1982). However such a system would not be directly applicable to a magnetic recording and reproduction apparatus, due to special conditions which arise in magnetic recording, i.e. the effects of non-linear distortion and saturation characteristics of the magnetic recording medium upon the reproduced (playback) signal.

The assignees of the present invention have previously proposed, in U.S. patent application Ser. No. 07/251,094 (1988,9,29), a multi-level modulation method providing a high recording rate and high utilization efficiency of the recording frequency band, for a digital signal magnetic recording and reproduction apparatus. However that proposal does not sufficiently take into consideration the effects of amplitude non-linearity which arises in the recording/reproduction process.

The problems which arise when applying to a magnetic recording and reproduction apparatus multi-level modulated signal as commonly used for digital data transmission will be summarized in the following using as an example 16 QAM (i.e. 16-state quadrature amplitude modulation), which is a widely utilized form of multi-level modulation. The term "multi-level modulation signal" as used herein refers to the class of modulation signals in which respective data values are expressed in each of successive symbol periods as a combination of quantized carrier amplitude and phase values, such as QAM or PSK signals. With 16 QAM, a modulation signal is generated which can be considered to consist of two carrier signal components that are in phase quadrature (the I and Q components), these being mutually independently amplitude-modulated at four fixed levels. Thus, one of a total of 16 possible symbols, or code values, can be expressed in each symbol period of a 16 QAM signal. When such a 16 QAM signal is received, the I and Q carrier components are separately demodulated, and the resultant demodulated I and Q signals are then sampled at appropriate time points, to determine the respective amplitude levels at the sampling times, i.e. a pair of demodulated I and Q amplitude values is obtained at each sampling time. In the prior art, discrimination of the respective codes represented by these demodulated I, Q pairs has been based on the fixed correspondence between the code values (usually, 4-bit binary code values) and the I, Q pairs that were used at the time of modulation. This can be understood by referring to FIG. 1, which is a diagram of the I-Q plane showing an example of a symbol constellation (i.e. array of signal reference points represented in the I-Q plane) of a 16 QAM signal. At the time of modulation, each code value of the signal to be recorded (e.g. the binary codes 0000 to 1111) is assigned a specific combination of states of the I, Q signals, these combinations being represented as a set of 16 reference points which in this example are spaced equidistantly in the I-Q plane, with one of these points being designated by numeral 201. At the time of modulation, the point 201 (i.e. a specific pair of I, Q values) might for example represent a binary code value 1011 of a digital signal that is to be recorded on a magnetic recording medium. When the QAM signal is subsequently reproduced from the recording medium, then as a result of amplitude distortion arising in the recording and reproduction process, the pair of I, Q values (originally corresponding to the point 201) that are obtained by demodulation of the QAM signal will now correspond to a different point in the I-Q plane, e.g. point 203. In that case no problem will arise with a prior art method of QAM signal decoding, in which all points (I, Q pairs) that are closer to the point 201 than to any other of the symbol constellation points (i.e. that fall within the hatched-line rectangle 202) will be discriminated as representing the code value that has been assigned to the point 201. Thus, no error will arise in such a case. However with a magnetic recording and reproduction apparatus, a high degree of amplitude distortion (in addition to phase jitter) arises in the recording and reproduction process. Thus in some cases an I, Q data value pair in the reproduced signal, which should correspond to the constellation point 201, may be displaced to a position in the I-Q plane which is outside the rectangle 202, i.e. it becomes impossible for the system to discriminate that I, Q pair as representing the same binary code value as that assigned to point 201. An incorrect binary code value will thus be outputted in response to that I, Q pair by a prior art decoding apparatus.

Thus, with a prior art apparatus for decoding a 16 QAM signal, whose operation is based upon a set of fixed reference data (specifically, the 16 reference points 201 etc. in FIG. 1), the high level of amplitude distortion that is introduced in the recording and reproduction process of a magnetic recording and reproduction apparatus will result in a high error rate.

Although the above problem has been described for the particular case of 16 QAM using a rectangular symbol constellation, such a problem will also occur in the case of other types of multi-level modulation method used for digital data transmission, such as 8 PSK (8-state phase shift keying) modulation, having other forms of symbol constellation.

SUMMARY OF THE INVENTION

It is an objective of the present invention to overcome the disadvantages of the prior art as set out above, by providing a multi-level modulation signal decoding apparatus in which reference point data for use in decoding a multi-level amplitude modulation signal are derived based on average values of demodulated signal level, rather than utilizing fixedly predetermined reference point data.

To achieve the above objective, the present invention provides an apparatus for demodulating and decoding a multi-level modulation signal, the signal having first and second multi-level amplitude-modulated carrier components which differ in phase, the apparatus comprising:

demodulation means for demodulating the first and second components to obtain first and second demodulated signals respectively;

sampling means for periodically sampling the first and second demodulated signals to obtain respective successive pairs of demodulated data values, each of the pair consisting of a first data value derived from the first demodulated signal and a second data value derived from the second demodulated signal;

first code discrimination means coupled to receive the demodulated data values, and responsive to each of the demodulated data value pairs for producing a corresponding code data value in accordance with predetermined reference point data which expresses fixedly predetermined relationships between the data value pairs and code data values;

average value computation means for computing, for each of respective pluralities of the demodulated data value pairs for which an identical code data value has been generated by the first code discrimination means, an average value data value pair; and second code discrimination means coupled to receive the demodulated data values and to receive the average value data value pairs as respective compensated reference point data values, and responsive to the demodulated data value pairs for producing . corresponding code data values in accordance with the compensated reference point data values.

DESCRIPTION OF PREFERRED EMBODIMENTS

Figure 1:
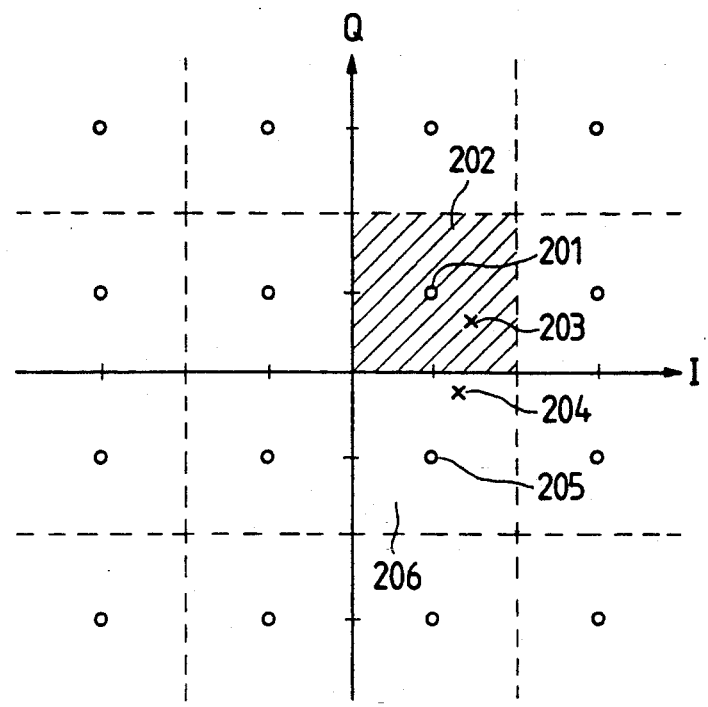
FIG. 1 is an I-Q plane diagram for assistance in describing the advantages provided by the present invention.
Figure 3:
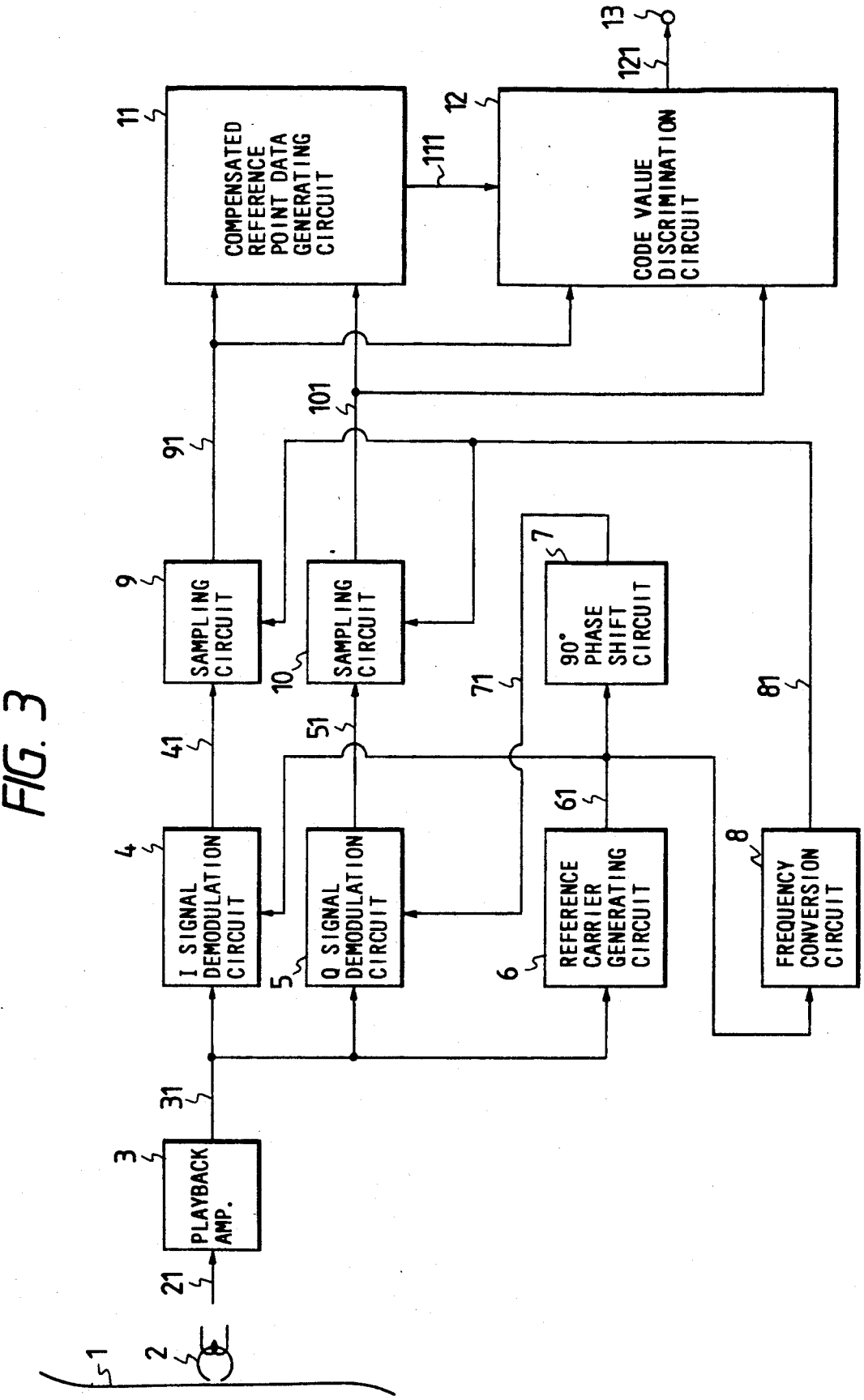
FIG. 3 is a general block diagram of an embodiment of a multi-level modulation signal decoding apparatus according to the present invention.

FIG. 3 is a block diagram of an embodiment of a multi-level modulation signal decoding apparatus according to the present invention. Numeral 1 denotes a magnetic recording medium having recorded thereon a QAM signal having a reference (I) carrier component and quadrature (Q) carrier component which are in phase quadrature and have been independently amplitude-modulated in each symbol period prior to recording in accordance with respective code values of a digital signal, using predetermined fixed amplitude levels. It will be assumed that the recorded signal is a 16 QAM signal, i.e. with four-level amplitude modulation having been applied to the I and Q components. It will also be assumed that the 16 states which can be represented in each symbol period of the QAM signal respectively correspond to the 16 4-bit binary code values 0000, 0001, ... 1111. Thus in each symbol period of the QAM recording signal, that signal can be considered to consist of a pair of I and Q values which in combination specify one of the 16 reference points 203, 205, etc. in FIG. 1, i.e. these 16 reference points respectively correspond to the 4-bit binary code values 0000 to 1111.

Figure 2:
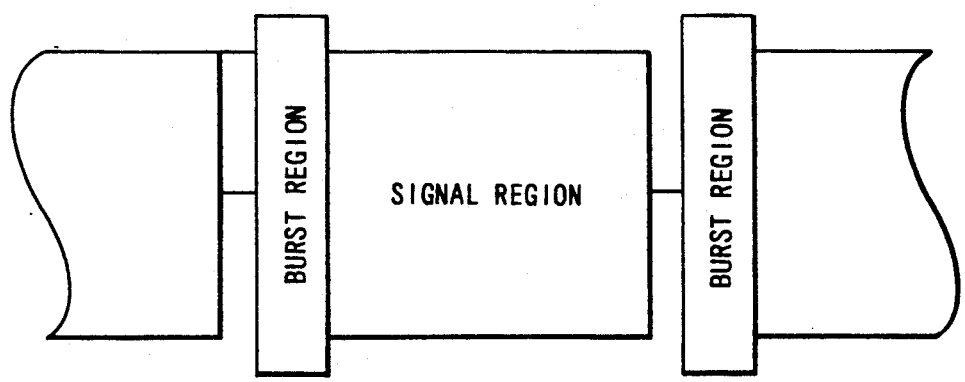
FIG. 2 shows an example of a magnetic recording signal format in which bursts of a reference carrier signal are periodically inserted.

In FIG. 3, the QAM signal designated by numeral 21 which is reproduced by the magnetic recording/playback head 2 of a magnetic recording and reproduction apparatus is amplified by a playback amplifier 3, and the resultant amplified signal is inputted to an I signal demodulation circuit 4, a Q signal demodulation circuit 5 and a reference carrier generating circuit 6. The reference carrier generating circuit 6 regenerates the reference carrier signal 61 from the amplified playback signal 31. The configuration of the reference carrier generating circuit 6 can be based for example on the method of carrier regeneration that is described in the aforementioned article by G. Ungerboeck "Channel Coding with Multilevel/Phase Signals", IEEE Trans. on IT, IT-28, No. 1, pp. 55–67, 1982. Alternatively, as illustrated in FIG. 2, a method can be used whereby bursts of a signal having an identical frequency to that of the QAM carrier and of identical phase to the reference (I) carrier phase are recorded on the magnetic recording medium together with the QAM signal, with the reference carrier being subsequently derived from these signal bursts contained in the playback signal.

The regenerated reference carrier 61 is supplied to the I signal demodulation circuit 4, and also to a 90° phase shifting circuit 7 and a frequency conversion circuit 8. The 90° phase shifting circuit 7 executes phase advancement of the reference carrier signal 61 by 90°, to obtain a 90° phase shifted carrier 71, which is supplied to the Q signal demodulation circuit 5. The frequency conversion circuit 8 executes frequency conversion of the reference carrier 61, to obtain a sampling clock signal 81 which determines respective appropriate time points for sampling the demodulated I and Q components of the QAM signal. The sampling clock signal 81 is supplied to respective sampling circuits 9 and 10.

The I signal demodulation circuit 4 multiplies the QAM signal 31 by the reference carrier signal 61 and transfers the resultant signal through a low pass filter, to thereby output a demodulated I signal 41. The Q signal demodulation circuit 5 similarly multiplies the QAM signal 31 by the 90° phase shifted carrier signal 71 and filters the resultant signal, to thereby output a demodulated Q signal 51. The demodulated I signal 41 is sampled in the sampling circuit 9 at the aforementioned sampling time points which are determined by the clock signal 81, to thereby obtain successive demodulated I data values 91 each representing the amplitude of the demodulated I signal at the sampling point. Similarly, demodulated Q signal 51 is sampled in the sampling circuit 10 at the sampling time points to thereby obtain successive demodulated Q data values 101 each representing the amplitude of the demodulated Q signal at the sampling point. Thus a pair of data values (one demodulated I data value and one demodulated Q data value) are obtained simultaneously at each sampling time point. Such a pair might for example correspond to point 203 or point 204 in FIG. 1 described hereinabove.

These demodulated I data values 91 and demodulated Q data values 101 are supplied to a compensated reference point data generating circuit 11, which assigns to each of these pairs of data values a (nominal) corresponding code value, determined in accordance with the aforementioned 16 reference points. That nominal code value may be correct (as would be the case for point 203 in FIG. 1), or incorrect, (as would be the case for point 204 as described hereinabove). In the compensated reference point data generating circuit 11, for each of successive sets of I, Q pairs which have been assigned an identical nominal code value, the average value of that set is obtained. The average values thus obtained are then supplied to a code value discrimination circuit 12, as compensated reference data 111 which represent a set of 16 compensated reference points as described in detail hereinafter. The demodulated I data values 91 and demodulated Q data values 101 are also inputted to the code value discrimination circuit 12, which utilizes the compensated reference data 111 to discriminate the demodulated data values, i.e. to assign respective corrected code values to the successive I and Q data value pairs. These code values are supplied from the code value discrimination circuit 12 as the final output data 121 from the apparatus, to an output terminal 13.

Figure 4:
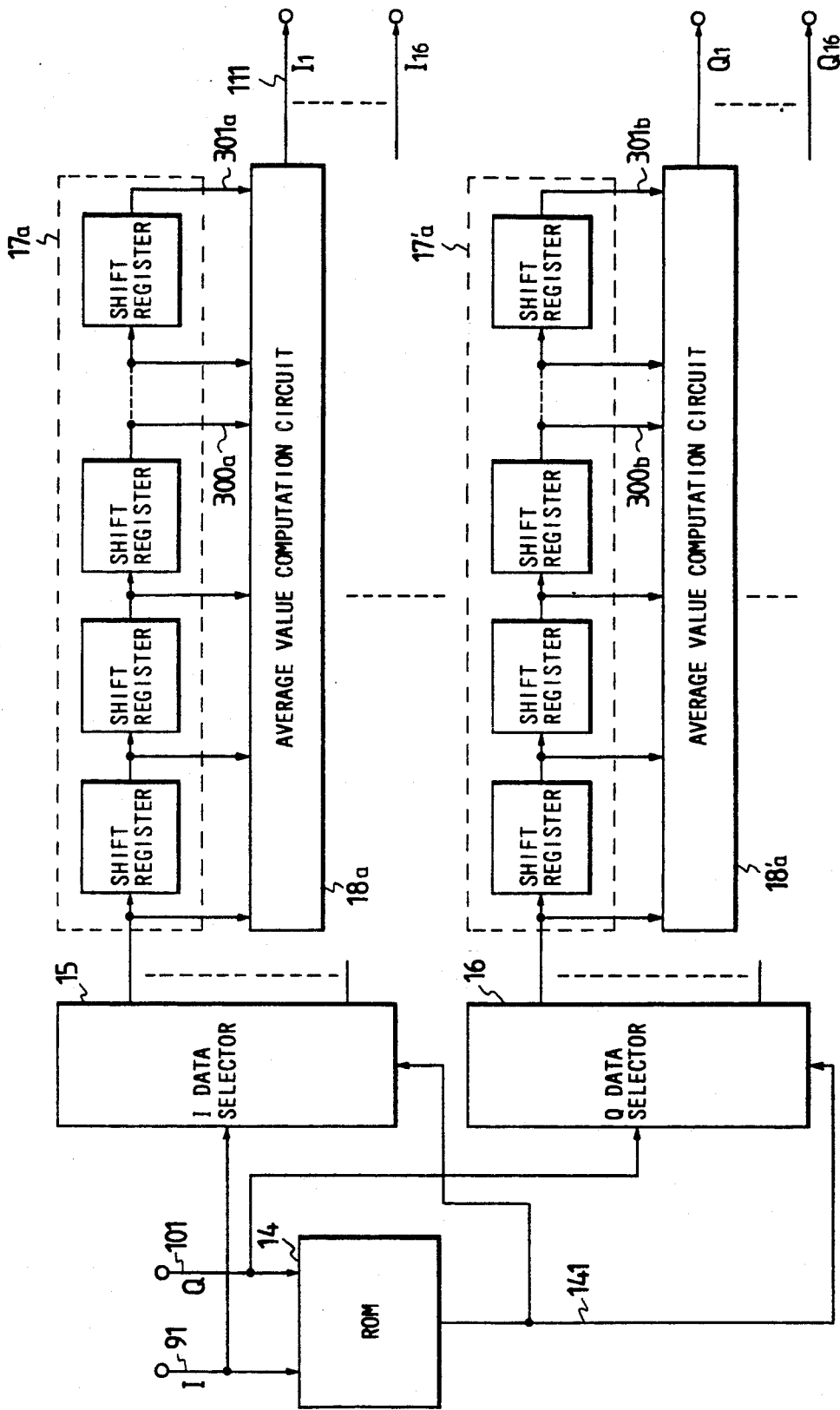
FIG. 4 is a block diagram showing the internal configuration of a compensated reference point data generating circuit 11 in FIG. 3.

FIG. 4 is a block diagram showing the internal configuration of the compensated reference point data generating circuit 11 of this embodiment. Numeral 14 denotes a ROM (read-only memory), which receives the successive pairs of demodulated I, Q data values produced from the sampling circuits 9 and 10. The ROM 14 has stored therein data representing relationships between all of the possible values of the I, Q data and the aforementioned 16 code values respectively corresponding to the aforementioned reference points, i.e. the ROM 14 functions as a code discrimination circuit whose operation is based on fixedly predetermined reference point data. That is to say, taking the example of FIG. 1, in response to inputting thereto an I, Q data value pair (I data value 91 and Q data value 101) which corresponds to any point within the rectangle 202 (i.e. to a point in the I-Q plane which is closer to the reference point 201 than to any of the other reference points) the ROM 14 produces the 4-bit binary code value corresponding to that reference point. That code value is supplied to each of an I data selector 15 and a Q data selector 16, which respectively also receive the demodulated I data values 91 and demodulated Q data values 101. The I data selector 15 serves to selectively transfer each demodulated I data value to one of a set of sixteen shift registers, each of which has the configuration of register 17a in FIG. 4, with the register being selected in accordance with the code value 141 that is being supplied from the ROM 14. Similarly, the Q data selector 16 selectively transfers each demodulated Q data value to one of a set of sixteen shift registers, each of which has the configuration of register 17a, with that register also being selected in accordance with the code value that is currently being supplied from the ROM 14.

As a result, the first of the set of shift registers for the I data and the first of the set of shift registers for the Q data, designated respectively as registers 17a, 17'a in FIG. 4, will always contain respective sets of demodulated I data values and demodulated Q data values which have been judged as (nominally) corresponding to one specific code value (e.g. binary code 0000). Similarly, the second of the set of shift registers for the I data and the second of the set of shift registers for the Q data will always contain sets of demodulated I data values and demodulated Q data values which have been judged as corresponding to a different code value (e.g. binary code 0001). Thus, the contents of the various shift registers 17a, 17'a etc. can be represented in the I-Q plane for example as shown in FIG. 2, in which it is assumed for simplicity that each of the shift registers 17a, 17'a etc. produces four outputs. As shown, the points in the I-Q plane corresponding to the pairs of demodulated I, Q data values held in these shift registers will be distributed throughout each of the rectangular regions that are delimited by broken lines that are equidistant from the respective reference points (201, 205 etc. of FIG. 1), rather than being concentrated at the reference points. For example, the pair of output data values 301a and 301b from the final stages of shift registers 17a, 17'a might represent one of the points (indicated as crosses) within the rectangular region 202 in FIG. 6. In that case the pair of output data values 300a and 300b from these shift registers would represent another point which is also within that same region 202.

The outputs from the various stages of shift register 17a are supplied to an average value computation circuit 18a, which computes the average value of these outputs, to obtain an average I data value, designated as $I_1$. Similarly, the fifteen other I data shift registers produce respective average I data values $I_2$ to $I_{16}$. In addition, the average value of the contents of the Q data shift register 17'a is computed by an average value computation circuit 18a', to be outputted as the average Q data value $Q_1$. Similarly, the fifteen other Q data shift registers produce respective average Q data values $Q_2$ to $Q_{16}$.

In this way, pairs of average I, Q data values are obtained from the average value computation circuits 18a etc., which can be utilized as data representing compensated reference points for code value discrimination. In this example as shown in FIG. 7 the average data value pair $I_1$, $Q_1$ are assumed to correspond to a point positioned at ($I_1$, $Q_1$) in the I-Q plane, which would constitute a compensated reference point in place of the reference point 201 at the center of the region 202 in FIG. 6, and the average data value pair $I_5$, $Q_5$ define a compensated reference point for the region 206. In this way a set of 16 compensated reference points are derived as illustrated in FIG. 7, defined by the respective average data value pairs $I_1$, $Q_1$ to $I_{16}$, $Q_{16}$.

Figure 5:
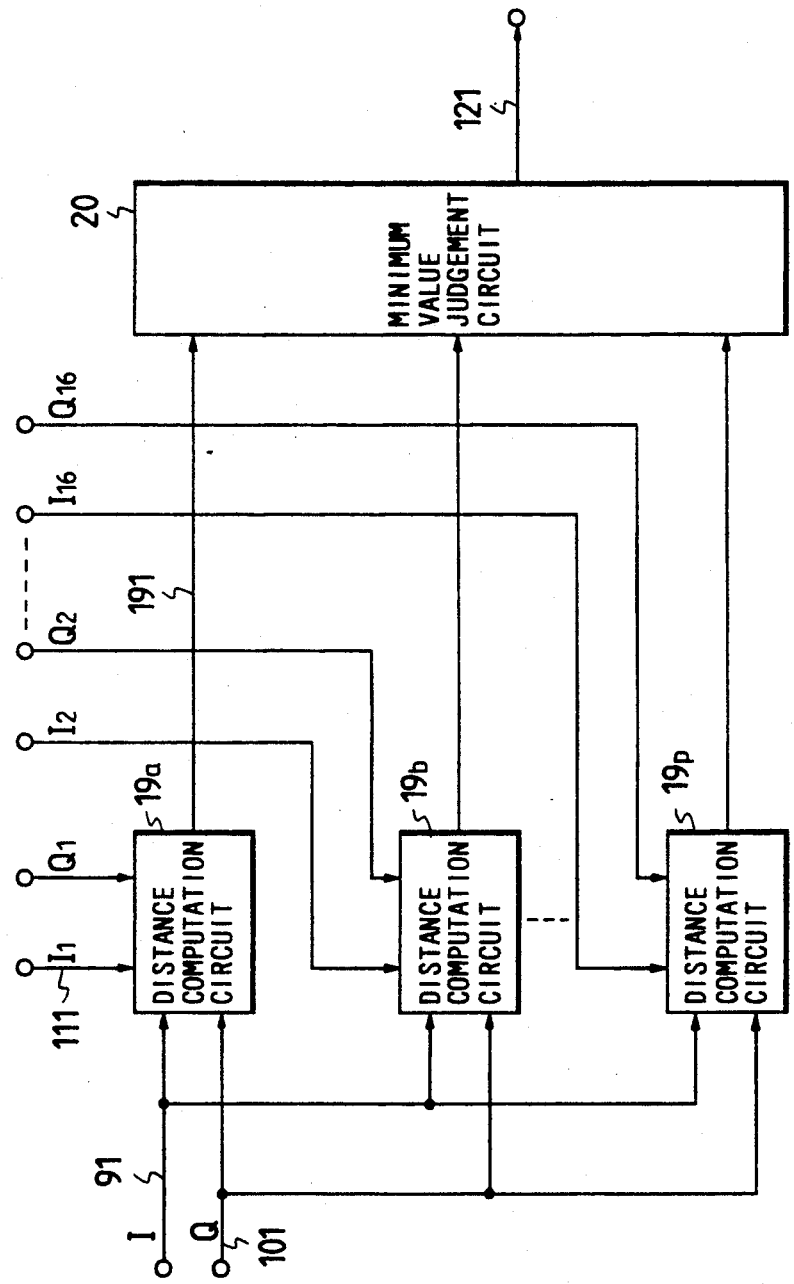
FIG. 5 is a block diagram showing the internal configuration of a code value discrimination circuit 12 in FIG. 3.

FIG. 5 shows the internal configuration of the code value discrimination circuit 12 of this embodiment. The basic function to be performed by this circuit is identical to that of the ROM 14 of FIG. 4. However since in this case the compensated reference points obtained from the compensated reference point data generating circuit 11 are utilized rather than the fixedly predetermined reference points used in the case of the ROM 14, a different circuit arrangement is utilized. 19a, 19b, . . . 19p designate a set of 16 distance computation circuits, each of which receives the demodulated I data value and demodulated Q data value pair that are currently being produced from the sampling circuits 9 and 10 respectively, while in addition the distance computation circuits 19a to 19p respectively receive the average data value pairs $I_1$, $Q_1$, $I_2$, $Q_2$, . . . $I_{16}$, $Q_{16}$ as shown. The distance computation circuits 19a to 19p function to compute the distances (i.e. vector length, as measured in the I-Q plane) between the point defined by the currently received demodulated I data value and demodulated Q data value pair 91, 101 and the respective compensated reference points that are defined by the average data value pairs $I_1$, $Q_1$, $I_2$, $Q_2$, . . . $I_{16}$, $Q_{16}$, and output respective data values 191 representing these distances. These distance values 191 are supplied to a minimum distance judgement circuit 20, which judges the compensated reference point that is closest to the currently received demodulated I data value and demodulated Q data value 91, 101, and produces as output data 121 the code value corresponding to that compensated reference point.

Figure 6:
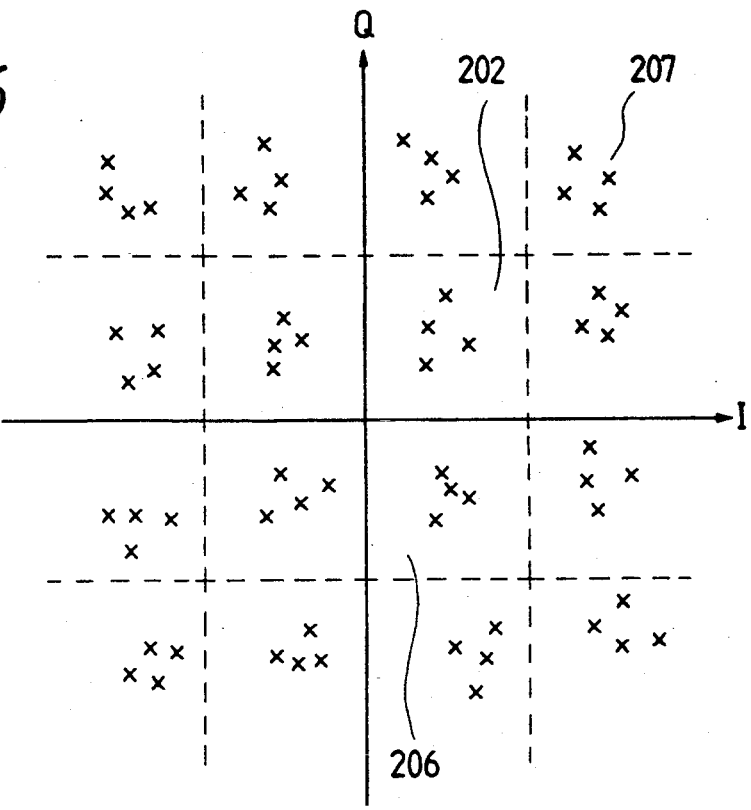
FIGS. 6 and 7 are I-Q plane diagrams for assistance in describing the derivation of compensated reference points by the circuit of FIG. 4.
Figure 7:
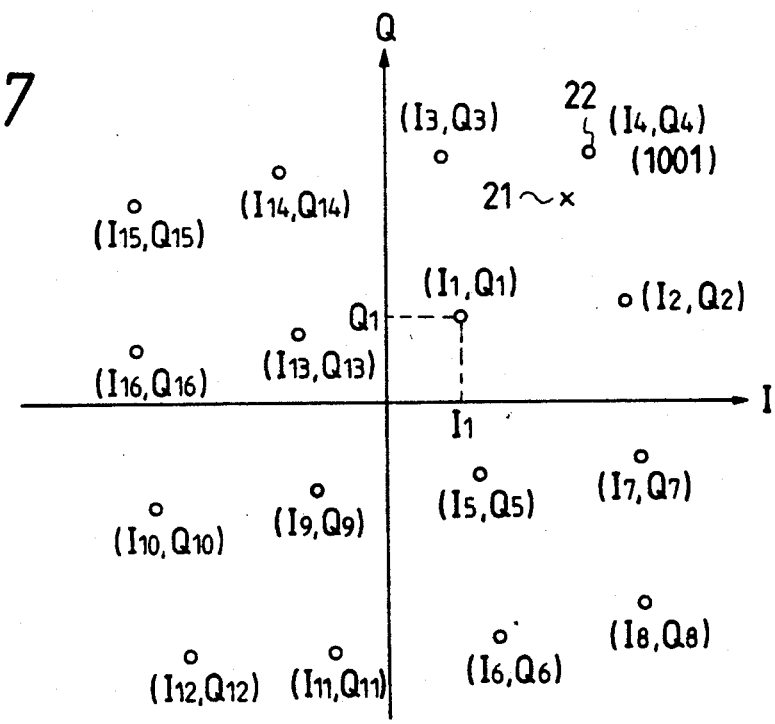

It can be understood from the preceding description relating to FIGS. 6 and 7 that each of the compensated reference points is assigned the code value of a corresponding one of the original reference points. For example, assuming that the reference point region 207 in FIG. 2 is assigned the 4-bit binary code value 1001, then the corresponding compensated reference point 22 in FIG. 7 will also be assigned that same code value. Thus if the demodulated I data value and demodulated Q data value pair 91, 101 that are currently being supplied to the distance computation circuits 19a to 19p correspond to the signal 21 in FIG. 7, then the minimum distance judgement circuit 20 will judge (based on the output values from the distance computation circuits 19a to 19p) that this point is closer to the compensated reference point 22 than to any of the other compensated reference points, and hence the binary code value for the compensated reference point 22 (1001) will be outputted from the minimum distance judgment circuit 20.

It will thus be apparent that by executing judgement of each demodulated pair of I, Q data values in this way, based upon reference points that are derived from average values of a reproduced multi-level modulated signal, more accurate discrimination of respective code values can be achieved. Taking for example the case of FIG. 1 described hereinabove, and assuming that a compensated reference point is derived by the compensated reference point data generating circuit 11 that corresponds to the reference point 201 but is positioned closer to the I axis then the reference point 201, then the code value discrimination circuit 12 would judge that the demodulated pair of I, Q data values represented by point 204 (which as described above should actually correspond to the reference point 201) is closer to that compensated reference point than to any of the other compensated reference points. Hence, the correct 4-bit binary code value will be outputted from the code value discrimination circuit 12 in response to that pair of demodulated I, Q data values, whereas with a prior art demodulation apparatus which utilizes fixedly predetermined signal reference points, an erroneous code value would be outputted in such a case.

Although the present invention has been described in the above with the reference to a 16 QAM modulation system, it will be understopod that the invention is applicable to various other multi-level modulation methods that are used in the prior art for digital signal transmission, such as 8 PSK modulation, etc.

It will also be understood that various changes could be envisaged in the described embodiment, which would fall within the scope of the present invention.

What is claimed is:

1. An apparatus for demodulating and decoding a multi-level modulation signal, said signal having at least first and second multi-level amplitude-modulated carrier components which mutually differ in phase, the apparatus comprising:

demodulation means for demodulating said first and second components to obtain first and second demodulated signals respectively;

sampling means for periodically sampling said first and second demodulated signals to obtain respective successive pairs of demodulated data values, each said pair consisting of a first data value derived from said first demodulated signal and a second data value derived from said second demodulated signal;

first code discrimination means coupled to receive said demodulated data values, and responsive to each said demodulated data value pairs for producing a corresponding code data value in accordance with predetermined reference point data which express fixedly predetermined relationships between said demodulated data value pairs and code data values;

average value computation means for computing, for each of respective pluralities of said demodulated data value pairs for which an identical code data value has been generated by said first code discrimination means, an average value data value pair ($I_1$, $Q_1$, $I_{16}$, $Q_{16}$); and second code discrimination means coupled to receive said demodulated data values and to receive said average value data value pairs as respective compensated reference point data values, and responsive to said demodulated data value pairs for producing corresponding code data values in accordance with said compensated reference point data values.

2. An apparatus according to claim 1, together with a reproducing head, and wherein in which said multi-level modulation signal is a signal which is reproduced by a magnetic recording and reproducing head from a magnetic recording medium.

3. An apparatus according to claim 1 in which said first and second amplitude modulated carrier components are in a phase quadrature relationship, and in which said demodulation means comprises;

means for extracting from said multi-level modulation signal a reference carrier signal;

means for phase shifting said reference carrier signal by 90° to obtain a phase shifted reference carrier signal;

a first demodulator circuit coupled to receive said multi-level modulation signal, for demodulating said first component based on said reference carrier signal; and a second demodulator circuit coupled to receive said multi-level modulation signal, for demodulating said second component based on said phase shifted reference carrier signal.

4. An apparatus according to claim 1, in which said sampling means comprises:

sampling clock signal generating means coupled to receive said multi-level modulation signal, for deriving from said multi-level modulation signal a sampling clock signal which expresses appropriate sampling time points for use in sampling said first and second demodulated signals; and first and second sampling circuits respectively coupled to receive said first and second demodulated signals, and controlled by said sampling clock signal for sampling said first and second demodulated signals at successive sampling time points to obtain said successive pairs of demodulated data values.

5. An apparatus for demodulating and decoding a multi-level modulation signal, said signal having at least first and second multi-level amplitude-modulated carrier components which mutually differ in phase, said multi-level modulation signal includes periodic bursts of a signal having a fixed frequency which is identical to a carrier frequency of said first and second components and a fixed phase which is identical to that of a carrier of one of said first and second components, the apparatus comprising:

demodulation means for demodulating said first and second components to obtain first and second demodulated signals respectively;

sampling means for periodically sampling said first and second demodulated signals to obtain respective successive pairs of demodulated data values, each said pair consisting of a first data value derived from said first demodulated signal and a second data value derived from said second demodulated signal;

first code discrimination means coupled to receive said demodulated data values, and responsive to each said demodulated data value pairs for producing a corresponding code data value in accordance with predetermined reference point data which express fixedly predetermined relationships between said demodulated data value pairs and code data values;

average value computation means for computing, for each of respective pluralities of said demodulated data value pairs for which an identical code data value has been generated by said first code discrimination means, an average value data value pair ($I_1$, $Q_1$, $I_{16}$, $Q_{16}$); and second code discrimination means coupled to receive said demodulated data values and to receive said average value data value pairs as respective compensated reference point data values, and responsive to said demodulated data value pairs for producing corresponding code data values in accordance with said compensated reference point data values.

* * * * *